(12) United States Patent
Kikuchi et al.

(10) Patent No.: US 9,080,073 B2
(45) Date of Patent: Jul. 14, 2015

(54) METHOD OF MAKING PARTIAL-DISCHARGE-RESISTANT INSULATED WIRE

(71) Applicant: HITACHI MAGNET WIRE CORPORATION, Ibaraki (JP)

(72) Inventors: Hideyuki Kikuchi, Hitachi (JP); Yuzo Yukimori, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 13/873,834

(22) Filed: Apr. 30, 2013

(65) Prior Publication Data

US 2013/0236638 A1    Sep. 12, 2013

Related U.S. Application Data

(62) Division of application No. 11/303,909, filed on Dec. 19, 2005.

(30) Foreign Application Priority Data

Apr. 25, 2005  (JP) .................................. 2005-126810

(51) Int. Cl.
*B05D 7/20* (2006.01)
*C09D 177/00* (2006.01)
(Continued)

(52) U.S. Cl.
CPC ............. *C09D 177/00* (2013.01); *C08K 5/3415* (2013.01); *C09D 7/1225* (2013.01); *C09D 7/1266* (2013.01); *C09D 179/08* (2013.01);
(Continued)

(58) Field of Classification Search
CPC ........ B05D 7/20; H01B 13/16; H01B 13/065; H01B 13/32; C09D 177/00
USPC ........... 427/117–120; 524/104, 106, 233, 234
See application file for complete search history.

(56) References Cited

U.S. PATENT DOCUMENTS 3,351,561 A   11/1967   Albrecht et al.
3,428,486 A    2/1969   George
(Continued)

FOREIGN PATENT DOCUMENTS

CN            1035514 A    9/1989
CN            1604974 A    4/2005
(Continued)

OTHER PUBLICATIONS

Hirata et al., "Resin paste for forming film, comprises epoxy resin, organic and/or inorganic microparticles, and polyamidoimide resin which is obtained by reacting polycarboxylic acid, diisocyanate and aromatic polyisocyanate in polar solvent", Derwent publication AN 2004-470930, May 13, 2004, 1pg.
(Continued)

*Primary Examiner* — Brian K Talbot
(74) *Attorney, Agent, or Firm* — Foley & Lardner LLP

(57) ABSTRACT

A partial-discharge-resistant insulating varnish has a polyamide-imide enamel varnish and an organo-silica sol that are dispersed in a solvent. The solvent has 50 to 100% by weight of γ-butyrolactone. An insulated wire has a conductor, and a partial-discharge-resistant insulation coating film formed on the surface of the conductor. The partial-discharge-resistant insulation coating film is made of the partial-discharge-resistant insulating varnish.

6 Claims, 2 Drawing Sheets

1 CONDUCTOR

2 PARTIAL-DISCHARGE-RESISTANT INSULATION COATING FILM

(51) Int. Cl.
*H01B 13/32* (2006.01)
*H01B 13/16* (2006.01)
*C08K 5/3415* (2006.01)
*C09D 7/12* (2006.01)
*C09D 179/08* (2006.01)
*H01B 13/06* (2006.01)
*C08K 3/36* (2006.01)

(52) U.S. Cl.
CPC .............. *H01B 13/065* (2013.01); *H01B 13/16* (2013.01); *H01B 13/32* (2013.01); *C08K 3/36* (2013.01); *Y10T 428/294* (2015.01); *Y10T 428/2927* (2015.01); *Y10T 428/2933* (2015.01)

(56) References Cited

U.S. PATENT DOCUMENTS

| | | | |
|---|---|---|---|
| 3,554,984 A * | 1/1971 | George | 528/350 |
| 3,778,417 A | 12/1973 | Serres | |
| 3,833,533 A | 9/1974 | Holub | |
| 4,026,876 A * | 5/1977 | Bateman et al. | 528/350 |
| 4,448,844 A | 5/1984 | Osada et al. | |
| 4,448,957 A * | 5/1984 | Ueno et al. | 528/351 |
| 4,505,980 A * | 3/1985 | Nishizawa et al. | 428/383 |
| 4,546,162 A | 10/1985 | Zecher et al. | |
| 4,950,700 A * | 8/1990 | Balme et al. | 524/111 |
| 5,684,119 A * | 11/1997 | Michaud et al. | 528/340 |
| 5,994,432 A | 11/1999 | Michaud | |
| 6,051,665 A * | 4/2000 | Yamada et al. | 525/477 |
| 6,316,046 B1 * | 11/2001 | Liener et al. | 427/117 |
| 6,441,083 B1 | 8/2002 | Kuwamoto et al. | |
| 6,489,013 B2 | 12/2002 | Nagai et al. | |
| 6,749,927 B2 * | 6/2004 | Cooray | 428/209 |
| 6,811,875 B2 * | 11/2004 | Kikuchi et al. | 428/372 |
| 6,818,678 B2 | 11/2004 | Yamaguchi et al. | |
| 6,914,093 B2 | 7/2005 | Xu | |
| 7,015,260 B2 | 3/2006 | Meloni | |
| 7,026,382 B2 | 4/2006 | Akiba et al. | |
| 7,061,081 B2 | 6/2006 | Yano et al. | |
| 7,364,799 B2 | 4/2008 | Kurita et al. | |
| 2003/0232144 A1 | 12/2003 | Kikuchi et al. | |
| 2004/0236012 A1 | 11/2004 | Xu | |
| 2004/0249019 A1 | 12/2004 | Meyer et al. | |
| 2006/0073315 A1 | 4/2006 | Orikabe | |
| 2006/0240254 A1 | 10/2006 | Kikuchi et al. | |
| 2006/0240255 A1 | 10/2006 | Kikuchi et al. | |
| 2009/0301753 A1 | 12/2009 | Kikuchi et al. | |
| 2011/0240331 A1 | 10/2011 | Kikuchi et al. | |
| 2011/0290528 A1 | 12/2011 | Honda et al. | |
| 2014/0154407 A1 | 6/2014 | Kikuchi et al. | |

FOREIGN PATENT DOCUMENTS

| | | |
|---|---|---|
| EP | 0 332 543 A1 | 9/1989 |
| JP | 05-148361 A | 6/1993 |
| JP | 07-126386 A | 5/1995 |
| JP | 08-092507 A | 4/1996 |
| JP | 10-247420 A | 9/1998 |
| JP | 10-334735 A | 12/1998 |
| JP | 2000-095997 A | 4/2000 |
| JP | 2001-064508 A | 3/2001 |
| JP | 2001-307557 A | 11/2001 |
| JP | 2002-003724 A | 1/2002 |
| JP | 2002-371182 A | 12/2002 |
| JP | 2004-137370 A | 5/2004 |
| JP | 2004-203719 A | 7/2004 |
| JP | 2004-204187 A | 7/2004 |
| WO | WO-03/033790 A1 | 4/2003 |

OTHER PUBLICATIONS

Mesaki et al., Hybrid Composites of Plyamide-Imide and Silica Applied to Wire Insulation, IEEE, 2001, pp. 1-4.

* cited by examiner

METHOD OF MAKING PARTIAL-DISCHARGE-RESISTANT INSULATED WIRE

The present application is a divisional of U.S. application Ser. No. 11/303,909, filed Dec. 19, 2005, which claims benefit of priority from the prior Japanese patent application No. 2005-126810, the entire contents of all of which are incorporated herein by reference.

BACKGROUND OF THE INVENTION

1. Field of the Invention

This invention relates to a partial-discharge-resistant insulating varnish, an insulated wire, and a method of making the same. In particular, this invention relates to: a partial-discharge-resistant insulating varnish that comprises a mixture of γ-butyrolactone as a solvent component, polyamide-imide enamel varnish and organo-silica sol; an insulated wire that a film of the partial-discharge-resistant insulation varnish is formed on a conductor; and a method of making the same.

2. Description of the Related Art

The partial discharge is generated such that, when a minute gap exists in an insulation for a wire or cable or between wires, electric field concentrates on that part to cause a weak discharge. Due to the partial discharge generated, the insulation deteriorates. Further, due to the progress of the deterioration, a breakdown will occur.

Especially, in windings used for a motor or transformer, for example, in enameled wires that enamel varnish is coated on a conductor and then baked to make a coating film thereon, the partial discharge can be generated mainly between the wires (between the coating films) or between the coating film and the core. Thus, erosion of the coating film may progress mainly due to cutting of molecular chain in the resin coating film or heat generation caused by collision of charged particles. As a result, the breakdown may occur.

In recent years, in an inverter-fed motor system used for energy saving or adjustable speed, many cases have been reported in which inverter surge (steep overvoltage) is generated to cause the motor breakdown. It is found that the motor breakdown is caused by the partial discharge due to the overvoltage of the inverter surge.

In order to prevent the partial discharge erosion, an enameled wire is known which has an insulation made of a enamel varnish that inorganic insulating particles such as silica and titania are dispersed in a heat-resistant resin solution with an organic solvent. Such an inorganic insulating particle can provide the enameled wire with the partial discharge resistance, and can further contribute to enhancement in thermal conductivity, reduction in thermal expansion and enhancement in strength.

Known methods of dispersing a silica fine particle as the inorganic insulating particle in a resin solution are such as a method of adding and dispersing a silica fine particles powder into the resin solution, and a method of mixing the resin solution and a silica sol (for example, JP-A-2001-307557). As compared to the method of adding the silica particles powder thereinto, the method of using the silica sol can facilitate the mixing and can offer the varnish that the silica is well dispersed. However, in this case, the silica sol needs a high compatibility with the resin solution.

When a polyimide-imide insulating material is used as the heat-resistant polymer, a solvent to this can be N-methyl-2-pyrrolidone (NMP), N,N-dimethylformamide (DMF), N,N-dimethylacetamide (DMAC), dimethylimidazolidinone (DMI) etc. In general, a solvent is used which contain mainly NMP and is diluted with DMF, aromatic alkylbenzene etc.

However, conventionally, when such a polyamide-imide enamel varnish with the solvent containing NMP as the main component is used to disperse the silica fine particles thereinto, the silica fine particles are aggregated not to allow the sufficient dispersion. There is a correlation between the partial discharge resistance of the wire coating film and the surface area of silica particles in the wire coating film. If the coating film is formed by using a silica-dispersed enamel varnish with insufficient dispersion, i.e., with many aggregates, the partial discharge resistance of the coating film must be reduced. Therefore, the silica fine particles need to be uniformly dispersed without the aggregates in the coating film.

On the other hand, when the organo-silica sol is used as a silica source, it is prepared by dispersing silica fine particles into an organic solvent such as DMAC, DMF, alcohol and ketone. However, such an organo-silica-sol has a low compatibility with the polyamide-imide resin being dissolved in the NMP, so that the aggregates will be likely generated. Further, even if a uniform dispersion can be obtained under limited conditions, there will be generated problems in long-term keeping quality, stability, and reproducibility.

SUMMARY OF THE INVENTION

It is an object of the invention to provide a partial-discharge-resistant insulating varnish that silica fine particles can be uniformly dispersed preventing the aggregation thereof so as to enhance the partial discharge resistance.

It is another object of the invention to provide an insulated wire that a coating film is formed on a conductor by using the partial-discharge-resistant insulating varnish.

It is another object of the invention to provide methods of making the partial-discharge-resistant insulating varnish and the insulated wire.

(1) According to one aspect of the invention, a partial-discharge-resistant insulating varnish comprises:

a polyamide-imide enamel varnish and an organo-silica sol that are dispersed in a solvent, wherein the solvent comprises 50 to 100% by weight of γ-butyrolactone.

In the above invention, the following modifications or changes may be made.

(i) a silica component of the organo-silica sol is 1 to 100 phr (parts per hundred parts of resin) by weight to a resin component of the polyamide-imide enamel varnish.

(ii) the organo-silica sol has an average particle size of 100 nm or less.

(2) According to another aspect of the invention, an insulated wire comprises:

a conductor; and a partial-discharge-resistant insulation coating formed on the surface of the conductor, wherein the partial-discharge-resistant insulation coating film is made of the partial-discharge-resistant insulating varnish as described above.

In the above invention, the following modifications or changes may be made.

(iii) The insulated wire further comprises an organic insulation coating film formed on the surface of the conductor, wherein the partial-discharge-resistant insulation coating film is formed on the surface of the organic insulation coating film.

(iv) The insulated wire further comprises an other organic insulation coating film formed on the surface of the partial-discharge-resistant insulation coating film.

(3) According to another aspect of the invention, a method of making a partial-discharge-resistant insulating varnish comprises:

mixing a polyamide-imide enamel varnish with an organo-silica sol, wherein the polyamide-imide enamel varnish comprises γ-butyrolactone as a main solvent, the organo-silica sol comprises γ-butyrolactone as a main dispersion solvent, and the partial-discharge-resistant insulating varnish comprises 50 to 100% by weight of γ-butyrolactone to a total amount of a solvent thereof.

In the above invention, the following modifications or changes may be made.

(v) the polyamide-imide enamel varnish comprises 60 to 100% by weight of γ-butyrolactone to a total amount of a solvent thereof.

(vi) the organo-silica sol comprises 80 to 100% by weight of γ-butyrolactone to a total amount of a dispersion solvent thereof.

(4) According to another aspect of the invention, a method of making an insulated wire comprises:

preparing a partial-discharge-resistant insulating varnish by mixing a polyamide-imide enamel varnish with an organo-silica sol; and coating the partial-discharge-resistant insulating varnish on the surface of a conductor and then baking the varnish to form a coating film on the conductor, wherein the polyamide-imide enamel varnish comprises γ-butyrolactone as a main solvent, the organo-silica sol comprises γ-butyrolactone as a main dispersion solvent, and the partial-discharge-resistant insulating varnish comprises 50 to 100% by weight of γ-butyrolactone to a total amount of a solvent thereof.

In the above invention, the following modifications or changes may be made.

(vii) The method further comprises forming an organic insulation coating film on the surface of the conductor, wherein the partial-discharge-resistant insulation coating film is formed on the surface of the organic insulation coating film.

Advantages of the Invention

The partial-discharge-resistant insulating varnish with enhanced partial discharge resistance can be obtained since the organo-silica sol is uniformly dispersed preventing the aggregation thereof.

The insulated wire can be less likely to be subjected to the partial discharge erosion since the conductor is coated by the partial-discharge-resistant insulating varnish with the organo-silica sol uniformly dispersed such that the insulation coating film can be formed with the silica uniformly dispersed. As a result, the insulated wire can be applied to various inverter-fed systems to significantly elongate the lifetime of electric appliances therewith.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Organo-Silica Sol

Figure 1:
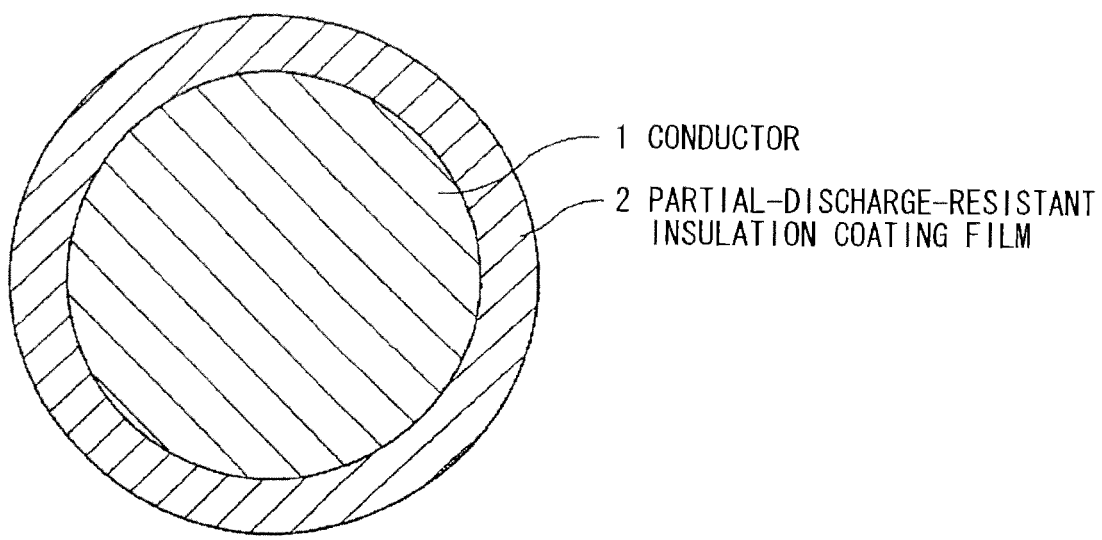
FIG. 1 is a cross sectional view showing an insulated wire in a preferred embodiment according to the invention.

The organo-silica sol used in the invention has preferably an average particle diameter (in the BET method) of 100 nm or less, more preferably of 30 nm or less so as to effectively provide the coating film with the partial discharge resistance. In case of 30 nm or less, the organo-silica sol itself has an enhanced transparency.

When γ-butyrolactone is as a main dispersion solvent for organo-silica sol, the compatibility of the sol with the resin solution can be enhanced to prevent the aggregation or increase in viscosity when being mixed. The dispersion solvent may contain, mixing with γ-butyrolactone, a polar solvent such as NMP and DMF, aromatic hydrocarbon or lower alcohol in order to enhance the stability. However, as the ratio of the mixed solvents increases, the compatibility with the resin solution will lower. Thus, the ratio of γ-butyrolactone is desirably 80% or more.

The organo-silica sol can be prepared by conducting the solvent replacement to a silica sol obtained by the hydrolysis of alkoxysilane or by a silica sol obtained by the ion exchange process of waterglass (sodium silicate). However, the organo-silica sol may be prepared by the other known method other than the above methods.

The suitable amount of moisture in the organo-silica sol may be varied depending on the composition of the mixed solvents for the dispersion. However, in general, when the amount is too much, the stability of the sol or the compatibility with the enamel varnish will lower. Therefore, the amount of moisture in the organo-silica sol is preferably 1.0% or less.

Since the organo-silica sol dispersed in the solvent with the abovementioned composition is excellent in dispersion property, the organo-silica sol can be obtained with a high silica concentration of 20% or more.

Polyamide-Imide Enamel Varnish

The polyamide-imide enamel varnish can be prepared by the synthesis reaction that 4,4'-diphenylmethane diisocyanate (MDI) and trimellitic anhydride (TMA) are reacted at equimol quantities in a solvent with NMP as a main component, which is most typically used from the aspect of property, cost or availability of materials. However, if the heat resistance of 200° C. or more can be kept in the polyamide-imide enameled wire, the raw material structure of aromatic isocyanates, aromatic carboxylic acids, and acid anhydrides is not limited specifically. Thus, it can be also prepared by known synthesis methods to react aromatic diamines such as 4,4'-diaminodiphenylmethane (DAM) with acid chlorides such as trimellitic acid chloride (TMAC).

The solvent for the polyamide-imide enamel varnish can be also γ-butyrolactone as a main component such that the compatibility of the sol with the resin solution can be enhanced to prevent the aggregation or increase in viscosity when being mixed. The solvent may contain, mixing with γ-butyrolactone, a polar solvent such as NMP and DMF, aromatic hydrocarbon or lower alcohol in order to enhance the stability. However, as the ratio of the mixed solvents increases, the compatibility with the resin solution will lower. Thus, the ratio of γ-butyrolactone is desirably 60% or more.

In order to prepare a polyamide-imide resin solution which contains γ-butyrolactone as a main solvent for polyamide-imide, any of known methods may be used such as: a method that polyamide-imide resin synthesized in a solvent with NMP as a main component is precipitated with ethanol to collect only the resin fraction, then it is re-dissolved in γ-butyrolactone; a method that the resin is directly synthesized in a solvent with γ-butyrolactone as a main component; and a method that the polyamide-imide enamel varnish synthesized in a low-boiling point solvent such as DMF is solvent-replaced by γ-butyrolactone in distillation. However, in a solvent of 100% γ-butyrolactone, the polyamide-imide is not synthesized with good reactivity. Therefore, a catalyst such as amines and imidazolines can be used therein. However, since γ-butyrolactone has a solubility of resin less than NMP etc., a compound with a biphenyl structure cannot be used therein.

Mixing of Organo-Silica Sol and Polyamide-Imide Resin Solution

Then, the organo-silica sol with γ-butyrolactone as the main dispersion solvent component is mixed with the polyamide-imide resin solution with γ-butyrolactone as the main solvent component. The solvent for the resultant partial-discharge-resistant enamel varnish can contain, mixing with γ-butyrolactone, a polar solvent such as NMP and DMF, aromatic hydrocarbon or lower alcohol in order to enhance the stability. However, as the ratio of the mixed solvents increases, the dispersion property of the silica particles in the enamel varnish will lower. Thus, the ratio of γ-butyrolactone is desirably 50% or more to the total amount of the solvents.

Partial-Discharge-Resistant Insulating Varnish

In general, a resin material well dissolved in a solvent has transparency even when it is colored. Also, insulating varnishes for enameled wires have generally transparency when they have no dispersed phase. The reason why the transparency is lost by the dispersion particles is that visible light cannot be transmitted since the dispersion particle has a large size. Therefore, it can be easily determined by the transparency of enamel varnish whether fine particles are uniformly dispersed or not. Similarly, it can be easily determined by the transparency of a coating film whether the silica fine particles are uniformly dispersed in the partial-discharge-resistant coating film coated on a conductor. Namely, when the predetermined amount of silica is dispersed, the effectiveness of the partial discharge resistance property can be easily determined by the transparency of the coating film.

In the embodiments of the invention, the polyamide-imide enamel varnish with γ-butyrolactone as the main solvent is used instead of the conventional polyamide-imide enamel varnish with NMP as the main solvent, and the solvent is the same as the dispersion solvent for the silica sol. Therefore, the compatibility can be enhanced such that the aggregation between silica particles, the precipitation of resin and the aggregation between silica and resin can be prevented when being mixed. Thus, a uniform varnish solution with transparency can be obtained. Also, when it is formed into coating film, the fine insulating coating film with good smoothness can be obtained.

EXAMPLES

FIG. 1 is a cross sectional view showing an insulated wire in a preferred embodiment according to the invention.

The insulated wire is structured such that a partial-discharge-resistant insulation coating film 2 is formed on a conductor 1. It is manufactured by coating the abovementioned partial-discharge-resistant insulating varnish around the conductor 1 and then baking it.

Figure 2:
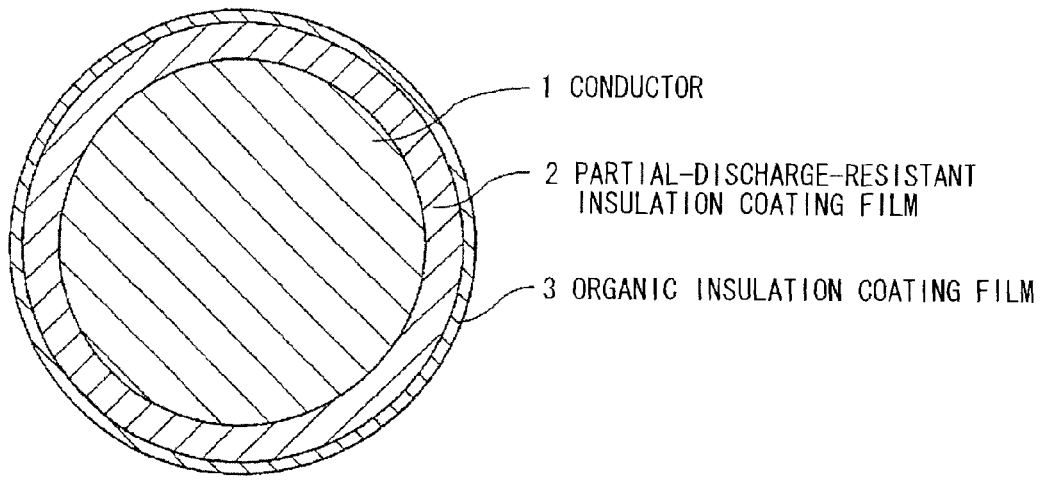
FIG. 2 is a cross sectional view showing an insulated wire in another preferred embodiment according to the invention.

FIG. 2 is a cross sectional view showing an insulated wire in another preferred embodiment according to the invention.

This insulated wire is structured such that an organic insulation coating film 3 is further formed around the partial-discharge-resistant insulation coating film 2 as shown in FIG. 1 in order to enhance the mechanical property (sliding property, scratch-resistant property etc.).

Figure 3:
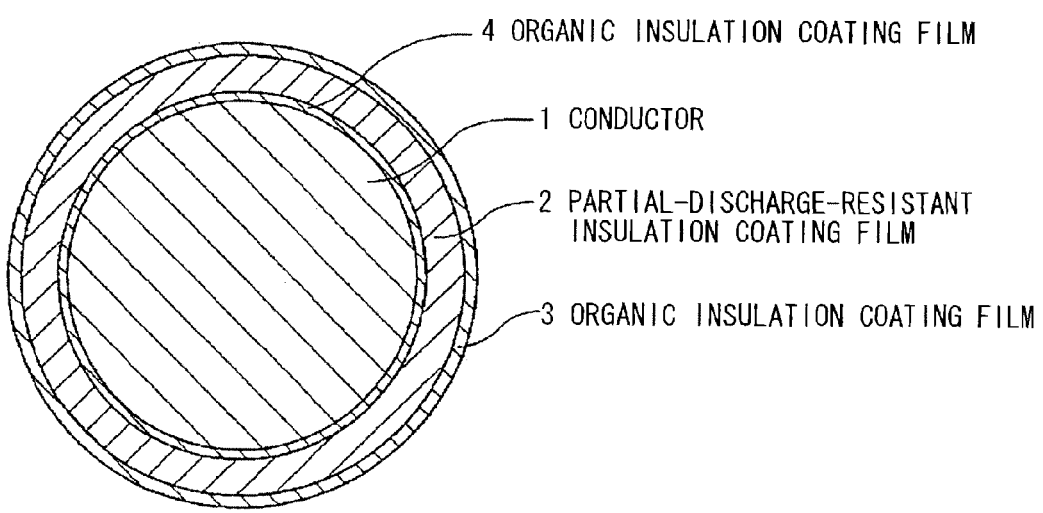
FIG. 3 is a cross sectional view showing an insulated wire in another preferred embodiment according to the invention.

FIG. 3 is a cross sectional view showing an insulated wire in another preferred embodiment according to the invention.

This insulated wire is structured such that an organic insulation coating film 4 is formed on the conductor 1, the partial-discharge-resistant insulation coating film 2 is formed on the organic insulation coating film 4, and the organic insulation coating film 3 is further formed around the partial-discharge-resistant insulation coating film 2.

Method of Making an Enameled Wire

Examples 1-5 and Comparative examples 1-5 as described below are manufactured as follows.

First, the polyamide-imide enamel varnish is prepared such that 300 parts by weight of the solvent component is to 100 parts by weight of the polyamide-imide resin. The organo-silica sol is prepared such that 300 parts by weight of the dispersion solvent component is to 100 parts by weight of the silica particles with an average particle diameter of 12 nm.

Then, the organo-silica sol is added to the polyamide-imide enamel varnish to have the partial-discharge-resistant insulating varnish. In this process, a preparation that 30 parts by weight of the silica is added to 100 parts by weight of the resin portion in the polyamide-imide enamel varnish is agitated to have the partial-discharge-resistant insulating varnish.

The resultant partial-discharge-resistant insulating varnish is coated on a copper conductor with a diameter of 0.8 mm, and then baked to have an enameled wire with a coating film thickness of 30 μm. The enameled wire is evaluated in dimensions, appearance, and V-t characteristic.

Meanwhile, the V-t characteristic is a characteristic to indicate the relationship between a breakdown voltage and a breakdown time. 1 kV voltage with sine waves of 10 kHz is applied to between twisted pair enameled wires, and a time up to the breakdown is measured.

Example 1

The polyamide-imide enamel varnish that 100% of the solvent component is γ-butyrolactone is mixed with the organo-silica sol that 100% of the dispersion solvent component is γ-butyrolactone to have the partial-discharge-resistant insulating varnish. The amount of γ-butyrolactone to the total amount of solvents is 100 wt %.

Example 2

The polyamide-imide enamel varnish with a mixed solvent that 80% of the solvent component is γ-butyrolactone and 20% thereof is cyclohexanone is mixed with the organo-silica sol that 100% of the dispersion solvent component is γ-butyrolactone to have the partial-discharge-resistant insulating varnish. The amount of γ-butyrolactone to the total amount of solvents is 84.6 wt %.

Example 3

The polyamide-imide enamel varnish with a mixed solvent that 85% of the solvent component is γ-butyrolactone and 15% thereof is NMP is mixed with the organo-silica sol that 100% of the dispersion solvent component is γ-butyrolactone to have the partial-discharge-resistant insulating varnish. The amount of γ-butyrolactone to the total amount of solvents is 89.7 wt %.

Example 4

The polyamide-imide enamel varnish that 100% of the solvent component is γ-butyrolactone is mixed with the organo-silica sol that 40% of the dispersion solvent component is benzyl alcohol and 60% thereof is solvent naphtha to have the partial-discharge-resistant insulating varnish. The amount of γ-butyrolactone to the total amount of solvents is 76.9 wt %.

Example 5

The polyamide-imide enamel varnish that 67% of the solvent component is γ-butyrolactone, 10% thereof is DMF and 23% thereof is cyclohexanone is mixed with the organo-silica sol that 40% of the dispersion solvent component is benzyl alcohol and 60% thereof is solvent naphtha to have the partial-discharge-resistant insulating varnish. The amount of γ-butyrolactone to the total amount of solvents is 51.3 wt %.

Comparative Example 1

The polyamide-imide enamel varnish that 80% of the solvent component is NMP and 20% thereof is DMF is mixed with the organo-silica sol that 100% of the dispersion solvent component is DMF to have the partial-discharge-resistant insulating varnish. The amount of γ-butyrolactone to the total amount of solvents is 0 wt %.

Comparative Example 2

The polyamide-imide enamel varnish that 100% of the solvent component is NMP is mixed with the organo-silica sol that 100% of the dispersion solvent component is DMAC to have the partial-discharge-resistant insulating varnish. The amount of γ-butyrolactone to the total amount of solvents is 0 wt %.

Comparative Example 3

The polyimide-imide enamel varnish that 50% of the solvent component is γ-butyrolactone and 50% thereof is NMP is mixed with the organo-silica sol that 100% of the dispersion solvent component is DMF to have the partial-discharge-resistant insulating varnish. The amount of γ-butyrolactone to the total amount of solvents is 38.5 wt %.

Comparative Example 4

The polyamide-imide enamel varnish that 80% of the solvent component is NMP and 20% thereof is DMF is mixed with the organo-silica sol that 100% of the dispersion solvent component is γ-butyrolactone to have the partial-discharge-resistant insulating varnish. The amount of γ-butyrolactone to the total amount of solvents is 23.1 wt %.

Comparative Example 5

The polyamide-imide enamel varnish is obtained that 80% of the solvent component is NMP and 20% thereof is DMF. The amount of γ-butyrolactone to the total amount of solvents is 0 wt %.

Table 1 shows the properties of the varnishes in Examples 1-5 and Comparative examples 1-5, and the properties (dimensions, appearance, and V-t characteristic) of the enameled wires manufactured by using the varnishes.

TABLE 1

| | | | Ex 1 | Ex 2 | Ex 3 | Ex 4 | Ex 5 |
|---|---|---|---|---|---|---|---|
| Composition of enamel varnish | polyamide-imide resin | | 100 | 100 | 100 | 100 | 100 |
| | composition of solvent | γ-butyrolactone | 300 | 240 | 260 | 300 | 200 |
| | | NMP | | | 40 | | |
| | | DMF | | | | | 30 |
| | | cyclohexanone | | 60 | | | 70 |
| Composition of organo-silica sol | silica | | 30 | 30 | 30 | 30 | 30 |
| | composition of dispersion solvent | γ-butyrolactone | | | | 36 | 36 |
| | | benzyl alcohol | | | | 36 | 36 |
| | | solvent naphtha | | | | | |
| | | DMF | | | | | |
| | | DMAC | | | | | |
| Amout of γ-butyrolactone to total amout of solvents [wt %] | | | 100 | 84.6 | 89.7 | 76.9 | 51.3 |
| Properties of partial-discharge-resistant insulating varnish | | appearance stability | transparent good | transparent good | transparent good | transparent good | transparent good |
| Properties of enameled wire | dimensions [mm] | conductor diameter | 0.800 | 0.800 | 0.800 | 0.800 | 0.800 |
| | | coating film thickness | 0.030 | 0.031 | 0.030 | 0.030 | 0.030 |
| | | finishing outside diameter | 0.860 | 0.861 | 0.860 | 0.860 | 0.860 |
| | appearance | | transparent | transparent | transparent | transparent | transparent |
| | V-t characteristic [h] 10 kHz-1.0 kV | without elongation | 80.3 | 78.2 | 79.4 | 76.8 | 77.0 |
| | | with 20% elongation | 44.6 | 45.3 | 45.8 | 42.8 | 46.7 |

TABLE 1-continued

| | | | Com EX 1 | Com EX 2 | Com EX 3 | Com EX 4 | Com EX 5 |
|---|---|---|---|---|---|---|---|
| Composition of enamel varnish | polyamide-imide resin | | 100 | 100 | 100 | 100 | 100 |
| | composition of solvent | γ-butyrolactone | | | 150 | | |
| | | NMP | 240 | 300 | 150 | 240 | 240 |
| | | DMF | 60 | | | 60 | 60 |
| | | cyclohexane | | | | | |
| Composition of organo-silica sol | silica | | 30 | 30 | 30 | 30 | — |
| | composition of dispersion solvent | γ-butyrolactone | | | | | |
| | | benzyl alcohol | | | | | |
| | | solvent naphtha | | | | | |
| | | DMF | 90 | | 90 | | |
| | | DMAC | | 90 | | | |
| Amount of γ-butyrolactone to total amount of solvents [wt %] | | | 0 | 0 | 38.5 | 23.1 | 0 |
| Properties of partial-discharge-resistant insulating varnish | | appearance | aggregated/clouded | aggregated/clouded | aggregated/clouded | aggregated/clouded | transparent |
| | | stability | precipitated | precipitated | precipitated | precipitated | good |
| Properties of enameled wire | dimensions [mm] | conductor diameter | 0.800 | 0.800 | 0.800 | 0.800 | 0.800 |
| | | coating film thickness | 0.031 | 0.030 | 0.030 | 0.030 | 0.030 |
| | | finishing outside diameter | 0.861 | 0.860 | 0.860 | 0.860 | 0.860 |
| | appearance | | whitened | whitened | whitened | whitened | transparent |
| | V-t characteristic [h] 10 kHz-1.0 kV | without elongation | 5.0 | 4.9 | 5.0 | 5.2 | 1.2 |
| | | with 20% elongation | 1.4 | 1.3 | 1.2 | 1.1 | 0.9 |

Ex 1-5: Examples 1-5,
Com Ex 1-5: Comparative examples 1-5

From the results of Table 1, it is found that the partial-discharge-resistant insulating varnish in Examples 1-5, which has 50 wt % or more of γ-butyrolactone to the total amount of solvents, is transparent and good in stability. In contrast, it is found that the partial-discharge-resistant insulating varnish in Comparative examples 1-4, which has less than 50 wt % of γ-butyrolactone to the total amount of solvents, is aggregated and clouded, and not good in stability with precipitation. Further, it is found that the enameled wire in Examples 1-5 is transparent in appearance and excellent in V-t characteristic, as compared to that in Comparative examples 1-5.

Furthermore, it is found that the partial-discharge-resistant insulating varnish in Examples 1-5 with the enamel varnish composition that γ-butyrolactone is 60% or more of the solvent component is transparent in appearance and excellent in stability. Also, it is found that the enameled wire using the varnish is transparent in appearance and excellent in V-t characteristic.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A method of making a partial-discharge-resistant insulating varnish, comprising:
   mixing a polyamide-imide enamel varnish with an organo-silica sol,
   wherein the polyamide-imide enamel varnish comprises a polyamide-imide resin and a mixed solvent used for a synthesis reaction of the polyamide-imide enamel varnish, the mixed solvent comprising 67 to 87% by weight of γ-butyrolactone and a balance consisting of 1) at least one of N-methyl-2-pyrrolidone and N,N-dimethylformamide, or 2) cyclohexanone and N,N-dimethylformamide,
   wherein the organo-silica sol comprises silica and a dispersion solvent comprising γ-butyrolactone, and
   wherein a total amount of γ-butyrolactone comprised in the mixed solvent and the dispersion solvent is 50% or more and less than 100% by weight relative to a total amount of the mixed solvent and the dispersion solvent.

2. The method according to claim 1, wherein:
   the organo-silica sol comprises 80 to 100% by weight of γ-butyrolactone to a total amount of the dispersion solvent.

3. The method according to claim 1, wherein:
   a total amount of γ-butyrolactone comprised in the mixed solvent and the dispersion solvent is 50 to 89.7% by weight relative to a total amount of the mixed solvent and the dispersion solvent.

4. A method of making an insulated wire, comprising:
   preparing a partial-discharge-resistant insulating varnish by mixing a polyamide-imide enamel varnish with an organo-silica sol; and
   coating the partial-discharge-resistant insulating varnish on the surface of a conductor and then baking the varnish to form a coating film on the conductor,
   wherein the polyamide-imide enamel varnish comprises a polyamide-imide resin and a mixed solvent used for a synthesis reaction of the polyamide-imide enamel varnish, the mixed solvent comprising 67 to 87% by weight of γ-butyrolactone and a balance consisting of 1) at least one of N-methyl-2-pyrrolidone and N,N-dimethylformamide, or 2) cyclohexanone and N,N-dimethylformamide,
   wherein the organo-silica sol comprises silica and a dispersion solvent comprising γ-butyrolactone, and wherein a total amount of γ-butyrolactone comprised in the mixed solvent and the dispersion solvent is 50% or more and less than 100% by weight relative to a total amount of the mixed solvent and the dispersion solvent.

5. The method according to claim 4, further comprising:

forming an organic insulation coating film on the surface of the conductor, wherein the partial-discharge-resistant insulation coating film is formed on the surface of the organic insulation coating film.

6. The method according to claim 4, wherein:

a total amount of γ-butyrolactone comprised in the mixed solvent and the dispersion solvent is 50 to 89.7% by weight relative to a total amount of the mixed solvent and the dispersion solvent.

* * * * *